3,388,980
METHOD OF MAKING GLASS POLISHING COMPOSITION
Homer Roberts Foster, Kittanning, Pa., assignor to Pittsburgh Plate Glass Company, Pittsburgh, Pa., a corporation of Pennsylvania
No Drawing. Filed Dec. 21, 1965, Ser. No. 515,306
4 Claims. (Cl. 51—293)

ABSTRACT OF THE DISCLOSURE

A glass polishing composition is produced by dissolving zirconium tetrachloride in water to provide a solution containing from 0.05 to 3.5 percent by weight dissolved zirconium, the pH value of the solution is adjusted to a range of 1.5 to 3.0 and thereafter zirconium oxide is added to the solution as an abrasive, so that there is dispersed therein between 0.25 and 10% by weight of zirconium oxide.

---

The present invention relates to improvements in glass polishing. More particularly, the present invention relates to an improved method of producing a glass polishing composition and to the particular glass polishing composition so produced.

It is known in the art to polish glass with materials such as rouge, zirconium oxide and rare earth abrasives containing cerium oxide. One of the difficulties in utilizing zirconium compounds is the expense incurred purchasing zirconium oxide as the abrasive material for a glass polishing composition. Another difficulty is the tendency of many zirconium oxides to form surface defects in certain polishing operations. Because cost and quality of polish dictate in great measure the advisability of utilizing one glass polishing abrasive over another, glass polishing compositions employing zirconium oxides present certain serious economic difficulties.

In accordance with the invention described in the copending application of John S. Sieger and Donald E. Cox, Ser. No. 403,980, filed Oct. 15, 1964, and now abandoned, entitled, "Glass Polishing Process and Composition," a method of polishing glass has been devised utilizing zirconium oxide and a new and novel glass polishing composition has been discovered which renders the use of zirconium oxide abrasive more economical by increasing the effectiveness of zirconium oxide as a glass polishing abrasive and minimizing its tendency to form defects. Under certain conditions, the novel composition therein disclosed possesses vastly superior glass removal rates than those commonly experienced with conventional rouge type compositions employed today in the plate glass making industry.

In accordance with the invention described and claimed in the aforesaid application, a slurry containing from about 0.25 to 10 percent by weight $ZrO_2$ is prepared. The slurry is an aqueous suspension of $ZrO_2$ in the weight percentages above indicated, and contains a certain but definite dissolved quantity of soluble zirconium. The soluble zirconium is supplied to the aqueous suspension in the form of zirconyl nitrate or zirconyl hydroxychloride. The zirconyl nitrate or hydroxychloride is utilized in quantities sufficient to provide on a weight basis between about 0.05 and 3.5 percent by weight soluble zirconium in the resulting solution. By "soluble zirconium" in the aforesaid application and in the following description is meant all the zirconium in the system exclusive of that in the zirconium oxide abrasive. It was found in accordance with the invention described in the aforesaid application that by a careful regulation of the soluble zirconium content of a given solution, the abrasive concentration of the glass polishing slurry may be lowered to a very small value, 1 percent or less, for example and still a satisfactory removal rate of glass achieved during a glass polishing operation. In determining the quantity of abrasive material which should be employed in the glass making compositions of that invention the soluble zirconium content of the aqueous slurry was correlated to the zirconia or $ZrO_2$ content because lower percentages of solid zirconia are capable of being employed when the soluble zirconium content is increased.

In the practice of the invention described in the aforesaid application consideration of critical importance resides in the maintenance during operation of pH values of the aqueous glass polishing slurry within certain and definite ranges. It was found in accordance with that invention that a pH of the aqueous suspension must be maintained within the range of about 1.5 to 4.5 in order to render the glass polishing compositions effective in producing high rates of glass removal during a glass polishing operation. Operations outside of this range give rise to glass removal rates which are not satisfactory for one or more reasons.

The particular form which the zirconium oxide abrasive material takes does not appear to be of critical importance in the glass making compositions contemplated therein, and zirconium oxides of many types may be employed. It is preferable to employ a zirconium oxide which has a high bulk density such as on the order of 30 to 50 pounds per cubic foot. Materials of this type have been found to be extremely efficient in removing glass, but a zirconium oxide of bulk density of higher or lower values may be employed with ease. The important consideration is that zirconium nitrate or hydroxychloride contained in the aqueous slurry of $ZrO_2$ must have present in that solution forming the slurry somewhere between about 0.05 and 3.5 percent soluble zirconium and be maintained in a pH range of between about 1.5 to about 4.5. The soluble zirconium in the solution exhibits an effect upon the abrasive qualities of the $ZrO_2$ or zirconia contained in the slurry so that superior glass removal rates are readily achieved. In the absence of the dissolved zirconia typical glass polishing compositions containing $ZrO_2$ do not function in a manner sufficient to enable them to be satisfactory for many polishing operations, such as for plate glass. Without dissolved zirconium and the critical pH range the slurry of zirconia cannot compete on an economic basis with the conventional rouge type materials due to the low rate of glass removal resulting therefrom, as well as its tendency to form defects on the glass surface.

In accordance with the present invention a glass polishing composition is prepared by dissolving zirconium tetrachloride ($ZrCl_4$) in water and adding lime (calcium hydroxide) to the solution, if necessary, to adjust the pH value of the solution to a value between 1.5 and 3.0, depending upon the quantity of soluble zirconium in the solution. Lime is used to adjust the pH value of the solution because sodium hydroxide and/or potassium hydroxide which could be used for the same purpose causes objectionable staining of the glass being polished. Staining means the formation of a white film on the glass. Moreover lime materially increases the removal rate from the glass on the order of 10 to 15% over sodium and/or potassium hydroxide. To this solution, zirconium oxide ($ZrO_2$) is added to provide the abrasive in the polishing composition.

Because the cost of zirconium tetrachloride is less than the cost of the zirconium compounds enumerated in the aforesaid application and the quantity of the zirconium oxide abrasive is substantially the same, the cost of the polishing compound is less. In view of the fact that removal rates of the polishing composition of this invention are generally as high as, and at times higher than, those of the copending application, a more economical polishing solution is provided. It has also been found that there is an economic advantage in using the polishing composition of this invention in lieu of the conventional rouge-copperas water polishing composition generally in use today. Thus, ground and polished plate glass can be produced more economically than ever before.

In preparing the polishing composition of this invention, sufficient zirconium tetrachloride is dissolved in water to provide a solution containing at least between 0.05 and 3.5 percent by weight soluble zirconium and perhaps higher. Generally, the quantity of zirconium tetrachloride is between 0.10 and 10 percent by weight of the water. However, economic consideration dictates the quantity of soluble zirconium in the solution, so that lower percentages are more attractive economically. Great care must be exercised when dissolving the zirconium tetrachloride in water because of the violent nature of the reaction therebetween and the production of hydrochloric acid gas when zirconium tetrachloride is added to water. Preferably, because of safety considerations of personnel and equipment, the zirconium tetrachloride is dissolved in water in such a manner that almost all, if not all, the hydrochloric acid gas is dissolved in the water. This is accomplished by introducing the zirconium tetrachloride beneath the surface of the water. The mixing process just described forms no part of this invention, and is the subject matter of a separate patent application of Lloyd G. Shick, Ser. No. 515,360 filed December 21, 1965, concurrently herewith, and entitled "Dissolving Zirconium Tetrachloride in Water," assigned to the assignee of the present application.

Because hydrochloric acid gas is dissolved in the water when the solution is produced, the solution is acidic and the pH value thereof is adjusted to the desired value of between 1.5 and 3.0. Lime is used to adjust the pH value of the solution, as mentioned above.

To the solution so produced, a quantity of zirconium oxide is added while the solution is being agitated. Generally from 0.25 to 10 percent by weight zirconium oxide is added to the solution to produce the polishing composition.

For a more complete understanding of the present invention, reference is made to the following examples which are illustrative of methods which may be employed in using the solution produced in accordance with the present invention. All polishing examples given herein below were run on a laboratory test machine.

The test machine consisted of a driven, rotating, horizontal table on which a glass plate is held by vacuum. A felt faced polishing tool is lowered onto the glass and is made to rotate by driving it from above and also is made to oscillate across the glass. Abrasive slurry is dropped onto the glass beside the rotating polishing block. The various speeds of rotation and oscillation and the feed rate of the abrasive and the pressure on the glass are controlled to give reproducible results. The device contains a smooth, circular metal table equipped with a central vacuum connection. The table is 19 inches in diameter and in operation a flat, 19 inches in diameter by ¼ inch thick, circular glass test plate is held on the table by vacuum. A piece of cloth separates the glass from the metal to prevent breaking of the glass. The table and glass are driven as a unit at a controlled speed by an electric motor. The polishing block consists of a solid 10 inch diameter cattle hair felt cemented to a metal back plate. The plate is attached through a second metal adapting plate to a rotating vertical shaft and is arranged to permit positive driving of the polishing block by a second motor. In operation the block is driven in the same direction as the glass. The entire block and shaft are oscillated across the surface of the rotating glass by a third motor, so that the rotating periphery of the felt block overhangs the edge of the glass by 1 inch at the furthermost point of the oscillation. At the center of the oscillation stroke the center of the block shaft is about 1 inch from the center of the table. The pressure on the felt is regulated by the addition of weights to the top of the shaft. Abrasive slurry is fed, at a controlled rate, by a pump from an agitated slurry reservoir, to the top surface of the glass at a point about midway between the center and edge of the plate. Concentrations of abrasive and additives and the pH of the slurry were adjusted before beginning the polishing operation. Provision was made for flushing residual abrasive slurry off the plate with water after completion of the test.

Before each series of experiments detailed in the examples below, a "break-in" period of operation, usually of about 20 minutes, was employed to condition the polishing pad with the slurry to be tested and enhance the reproducibility of results.

For comparison of the results of the examples below, a 6.5% zirconium oxide polishing slurry ($ZrO_2$ in water without "soluble zirconium") with a pH value of 7.2 was used on the test machine, as described, and for two 20-minute tests, the removal was measured to be 1.15 grams and 1.35 grams.

A 3% zirconium oxide polishing slurry ($ZrO_2$ in water without soluble zirconium) with the pH value adjusted by the addition of hydrochloric acid to 1.9 was used on the test machine. The removal was measured to be 0.74 gram for a 20-minute test.

A rouge-copperas water polishing slurry (7.0° Baumé) and a pH value of 3.3 was produced by adding 244 grams rouge and 81 grams copperas to 4,675 cubic centimeters water and used on the test machine. The removal was measured to be 2.4 grams for a 20-minute test.

Example I

A slurry was prepared by adding 10.5 pounds of zirconium tetrachloride ($ZrCl_4$) to 75 gallons of water. The pH value was measured and found to be 0.95. The pH value of the solution was adjusted to 2.08 by adding 2,000 grams of lime. 19.54 pounds of zirconium oxide ($ZrO_2$) was added as the abrasive. The slurry contained 0.625% soluble zirconium and 3.05% zirconium oxide.

After a 20-minute test on the test machine the glass removal was measured and found to be 4.68 grams.

This removal materially exceeds that measured when using a 6.5% zirconium oxide-water slurry, a 3% zirconium oxide-water slurry and the rouge-copperas polishing slurry, all under the same conditions.

The finish was examined and found to be good.

Example II

A slurry was prepared by adding 240.9 grams of zirconium tetrachloride ($ZrCl_4$) to 14,169 cubic centimeters of water. 1,500 cubic centimeters of the solution was removed and 9.5 grams of lime was added thereto to adjust the pH value of the removed solution to 1.90. 49 grams of zirconium oxide ($ZrO_2$) was added to the solution as the abrasive.

For two 20-minute tests on the test machine the glass removal was measured to be 4.18 and 4.15 grams.

The finish was inspected and determined to be good.

Example III

A slurry was prepared using 600 gallons of water, 85.2 pounds of zirconium tetrachloride, 42 pounds of lime and 50 pounds of zirconium.

The pH value of the slurry was 1.9 and the slurry contained 0.625% soluble zirconium and 1% zirconium oxide. The solution was fed at a rate of 850 to 1,500 cubic centimeters per minute to each runner on a commercial plate glass line during a production run.

Using only 50% of the number of runners on the line, the zirconium slurry described produced a finish comparable to this produced using all the runners on the line with a rouge-copperas solution of about 2.5° Baumé and with a pH value of 3.3.

What is claimed is:
1. A method of producing a glass polishing composition comprising,
dissolving a quantity of zirconium tetrachloride in water to provide a solution containing from 0.05 to 3.5 percent by weight dissolved zirconium,
adjusting the pH value of the zirconium containing solution to a range of 1.5 to 3.0,
and thereafter adding zirconium oxide to said solution so that there is dispersed therein between 0.25 and 10 percent by weight zirconium oxide as an abrasive.

2. A method as recited in claim 1 wherein said pH value is adjusted by adding calcium hydroxide.

3. A method as recited in claim 1 wherein said pH value is adjusted to a value of between 1.7 and 2.3.

4. A method as recited in claim 1 wherein the quantity of zirconium tetrachloride is between 0.10 percent and 10 percent by weight of the weight of the water.

References Cited

UNITED STATES PATENTS

| | | | |
|---|---|---|---|
| 2,955,031 | 10/1960 | Bliton et al. | 51—309 |
| 2,996,369 | 8/1961 | Harris et al. | 51—309 |
| 3,071,455 | 1/1963 | Harman et al. | 51—308 |
| 3,097,083 | 7/1963 | Silvernail | 51—307 |
| 3,123,452 | 3/1964 | Harris et al. | 51—309 |
| 3,131,039 | 4/1964 | Nonamaker | 51—309 |
| 3,254,949 | 6/1966 | Clearfield | 51—309 |

DONALD J. ARNOLD, *Primary Examiner.*